(12) United States Patent
Kim et al.

(10) Patent No.: US 8,195,871 B2
(45) Date of Patent: Jun. 5, 2012

(54) METHOD OF HANDLING I/O REQUEST AND SOLID STATE DRIVE USING THE SAME

(75) Inventors: Jin-kyu Kim, Seoul (KR); Hyung-gyu Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 434 days.

(21) Appl. No.: 12/467,449

(22) Filed: May 18, 2009

(65) Prior Publication Data

US 2010/0180070 A1 Jul. 15, 2010

(30) Foreign Application Priority Data

Jan. 13, 2009 (KR) .................. 10-2009-0002766

(51) Int. Cl.
*G06F 13/00* (2006.01)
*G06F 13/28* (2006.01)

(52) U.S. Cl. ................. 711/103; 711/E12.008

(58) Field of Classification Search ............. 711/103, 711/E12.008
See application file for complete search history.

(56) References Cited

U.S. PATENT DOCUMENTS

| 2009/0292862 A1* | 11/2009 | Kitahara | 711/103 |
| 2010/0017561 A1* | 1/2010 | Yang et al. | 711/103 |
| 2010/0037001 A1* | 2/2010 | Langlois et al. | 711/103 |
| 2010/0082890 A1* | 4/2010 | Heo et al. | 711/103 |
| 2010/0115183 A1* | 5/2010 | Araki et al. | 711/103 |

FOREIGN PATENT DOCUMENTS

| KR | 10-2006-0118382 | 11/2006 |
| KR | 10-2007-0057337 | 6/2007 |
| KR | 100832461 | 5/2008 |

\* cited by examiner

*Primary Examiner* — Ly D Pham
(74) *Attorney, Agent, or Firm* — NSIP Law

(57) ABSTRACT

A solid state drive (SSD) including a storage that includes a plurality of flash memories configured to be independently drivable and a controller to receive an input/output (I/O) request from a host, to split the I/O request into a plurality of sub-requests each having a size configured to be capable of being processed independently by each flash memory, and to process the I/O request based on the sub-requests.

20 Claims, 9 Drawing Sheets

METHOD OF HANDLING I/O REQUEST AND SOLID STATE DRIVE USING THE SAME

CROSS-REFERENCE TO RELATED APPLICATION(S)

This application claims the benefit under 35 U.S.C. §119 (a) of Korean Patent Application No. 10-2009-0002766, filed Jan. 13, 2009, the disclosure of which is incorporated herein in its entirety by reference.

BACKGROUND

1. Field

The following description relates to a technique for processing an input/output (I/O) request in a solid state drive. More particularly, this description relates to a method of handling I/O request and solid state drive (SSD) using the method.

2. Description of the Related Art

An SSD commonly refers to an apparatus for storing information using a semiconductor device. Currently, research has been conducted to use and operate SSD devices in ways similar to a hard disk drive (HDD) but without mechanical operation.

An SSD can input or output data at a higher speed than an HDD and has very low mechanical delay and failure rate. An SSD also has low in power consumption and is light in weight.

Typically, an SSD includes a plurality of memory modules and a controller to control the memory modules. The controller may exchange data with a host through an interface.

The controller may receive an I/O request from a host and process the I/O request. When a storable address of each memory module is determined in advance and an I/O request size is not large, some memory modules may enter an idle state leaving only a few operating remaining memory modules. However, this lack of operating memory modules may become severe when a large quantity of small-size requests occur after a workload shows a random access pattern.

SUMMARY

In a general aspect, a solid state drive (SSD) includes a storage including a plurality of flash memories configured to be independently drivable and a controller to receive an input/output (I/O) request from a host, to split the I/O request into a plurality of sub-requests each having a size configured to be processed independently by each flash memory, and to process the I/O request based on the sub-requests.

The controller may add the sub-requests to virtual queues respectively allocated to the flash memories.

The sub-requests may be added to virtual queues of corresponding flash memories according to I/O addresses included in each of the sub-requests.

The controller may drive at least some of the flash memories at once to process at least one I/O request simultaneously.

The controller may include a splitter to split the I/O request from the host into the plurality of sub-requests and a buffer to store the sub-requests temporarily.

The buffer may add the sub-requests to virtual queues respectively allocated to the flash memories.

The storage may include a plurality of NAND flash memories.

The size of each sub-request may be one of a page unit and a block unit of the flash memories.

The SSD may further include a host interface to receive the I/O request from the host and to transmit the process result of the I/O request.

In another general aspect, a method of handling an input/output (I/O) request in a solid state drive (SDD) including a plurality of flash memories includes splitting by a controller an I/O request from a host into a plurality of sub-requests each having a size configured to be processed independently by each flash memory and adding by the controller the sub-requests to virtual queues respectively allocated to each flash memory.

The method may further include driving by the controller at least some of the flash memories at once based on the sub-requests to process the at least one I/O request simultaneously.

The I/O request may be processed when the flash memories are not busy.

The sub-requests may be added to virtual queues of corresponding flash memories according to I/O addresses included in each of the sub-requests.

The size of each sub-request may be one of a page unit and a block unit of the flash memories.

Other features and aspects will be apparent from the following description, drawings, and claims.

BRIEF DESCRIPTION OF THE DRAWINGS

Throughout the drawings and the detailed description, unless otherwise described, the same drawing reference numerals will be understood to refer to the same elements, features, and structures. The relative size and depiction of these elements may be exaggerated for clarity and convenience.

DETAILED DESCRIPTION

The following detailed description is provided to assist the reader in gaining a comprehensive understanding of the media, methods, apparatuses, and systems described herein. Accordingly, various changes, modifications, and equivalents of the media, methods, apparatuses, and systems described herein will be suggested to those of ordinary skill in the art. Also, descriptions of well-known functions and structures may be omitted for increased clarity and conciseness.

Figure 1:
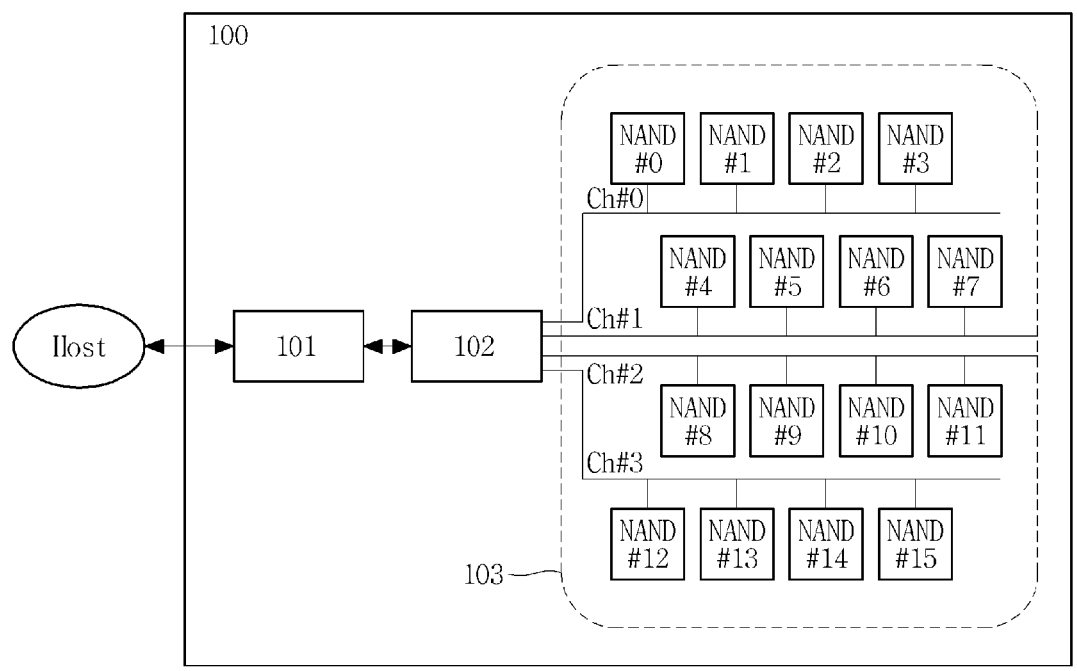
FIG. 1 is a diagram illustrating an exemplary configuration of an SSD.

FIG. 1 illustrates an exemplary SSD 100 that includes a host interface 101, a controller 102, and a storage 103. The host interface 101 transfers data between the SSD 100 and a host. The host interface 101 may be a serial advanced technology attachment (SATA) or a parallel advanced technology attachment (PATA) interface. Data I/O between the SSD 100 and the host may include consecutive logical address units, and an immediate I/O request may be referred to as a "request."

The host interface 101 may receive one or more I/O requests from the host and may transfer them to the controller 102.

The controller 102 controls the storage 103 in order to process an I/O request received from the host. The storage 103 may include a plurality of flash memories e.g., NAND#0, NAND#1, . . . , and NAND#15), which may be independently driven. Each flash memory may be implemented as a NAND flash memory and may be connected to the controller 102 through a channel (e.g., CH#0, CH#1, CH#2, and CH#3).

When an I/O request is transferred to the controller 102 through the host interface 101, the controller 102 may store received data in a certain flash memory according to a data write command from the host or the controller 102 may read out data stored in a certain flash memory according to a data read command from the host and transfer the read data to the host.

When processing an I/O request from the host, the controller 102 can split the I/O request into programmable or readable sub-requests and reorder the sub-requests in the flash memories. For example, a received request may be split into sub-requests of a size which can be individually processed by the flash memories, and the sub-requests may be added to and temporarily stored in virtual queues, respectively, allocated to the flash memories.

Figure 2:
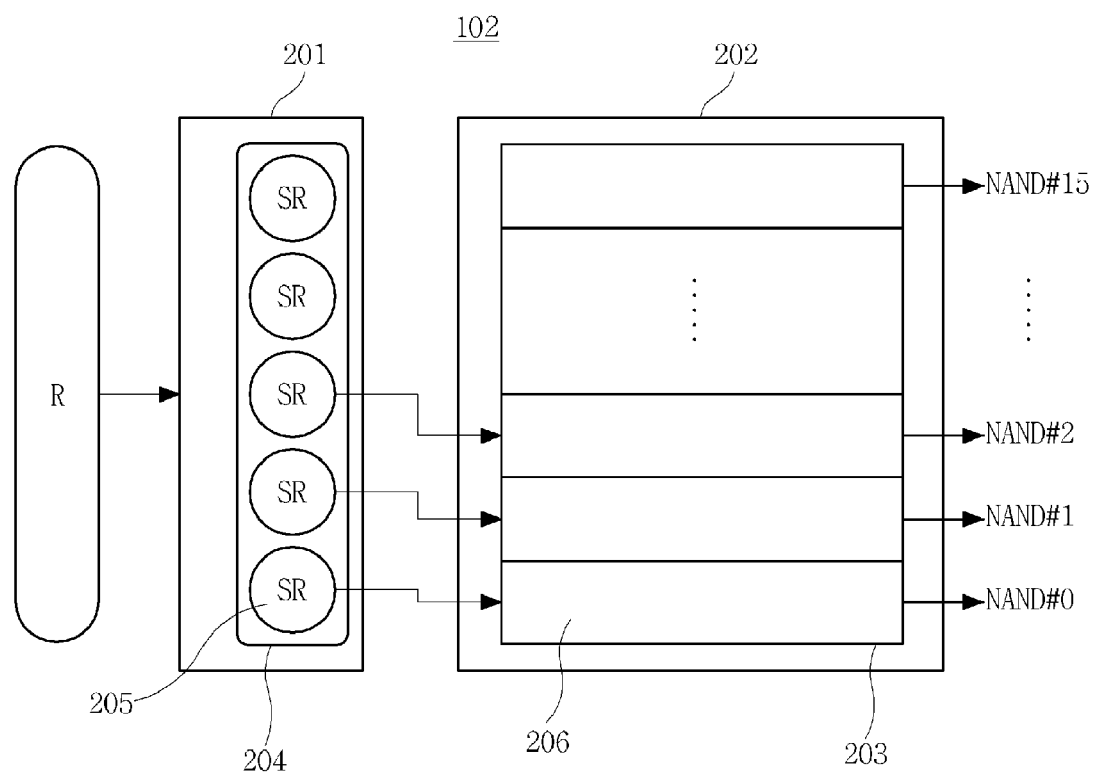
FIG. 2 is a diagram illustrating an exemplary controller.

FIG. 2 illustrates an exemplary controller 102 that includes a splitter 201 and a buffer 202.

The splitter 201 splits an I/O request "R" into sub-requests 204. Each sub-request 204 may be of the size that may be processed independently by each flash memory (e.g., a page unit or a block unit of a flash memory).

The buffer 202 temporarily stores the sub-requests 204. The buffer 202 may have virtual queues 203, allocated to the flash memories, respectively.

The sub-requests 204 split by the splitter 201 are added to the virtual queues 203, respectively. When added, the sub-requests 204 may be added to a virtual queue 203 that corresponds to an objective flash memory based on an I/O address included in each sub-request.

For example, when an objective flash memory of the sub-request 205 "#0" is determined to be "NAND#0" based on an I/O address, the sub-request 205 "#0" may be added to a virtual queue 206 allocated to the "NAND#0." The remaining sub-requests 204 may be added to virtual queues of corresponding objective flash memories, respectively. Here, since a first I/O request can have consecutive address spaces, its sub-requests may be added to virtual queues of adjacent flash memories, respectively.

The I/O request R may be processed after all sub-requests 204 are added to virtual queues 203. Therefore, when a plurality of I/O requests R are input, the I/O requests R may be split into sub-requests 204 and stored, and thereafter when a maximum number of flash memories are capable of being simultaneously driven, the I/O requests are processed. Thus, it is possible to maximize the parallel processing effect of the flash memories.

Figure 3:
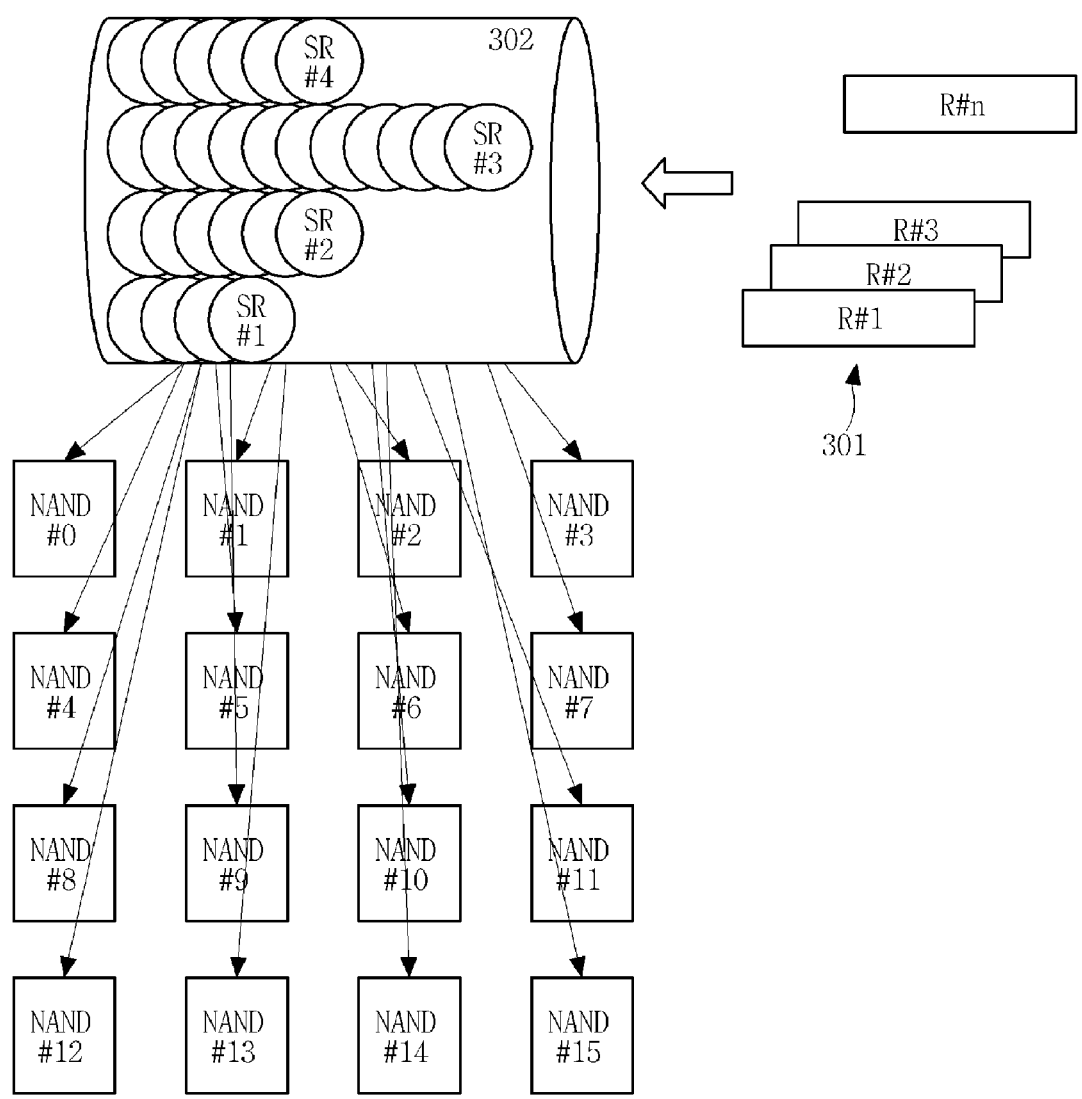
FIG. 3 is a diagram illustrating an exemplary buffer.

FIG. 3 illustrates an exemplary buffer 302 that may temporarily store a plurality of sub-requests "SR." The buffer 302 may be disposed inside the controller 102 or formed as a discrete memory device and controlled by the controller 102.

When the controller 102 has received a plurality of I/O requests 301, the controller 102 splits the plurality of I/O requests 301 into sub-requests SR and stores the sub-requests in the buffer 302. The buffer 302 may include virtual queues respectively allocated to flash memories (e.g., NAND#0 to NAND#15).

When the buffer 302 is filled with sub-requests up to a predetermined level or more, the controller 102 may drive the flash memories to process the I/O requests 301. At this time, the I/O requests 301 can be processed based on the sub-requests added to virtual queues of the flash memories. For example, sub-requests may be stored in the buffer 302 until a maximum number of flash memories can be driven and transferred to the flash memories at once. In this instance, since the I/O requests are processed while simultaneously driving a plurality of the flash memories, I/O processing efficiency may be increased.

A quantity of sub-requests stored in a virtual queue may be variously set depending on a type of an I/O request or performance of a flash memory.

FIGS. 4, 5, 6, 7, and 8 illustrate an exemplary operation of an SSD.

Figure 4:
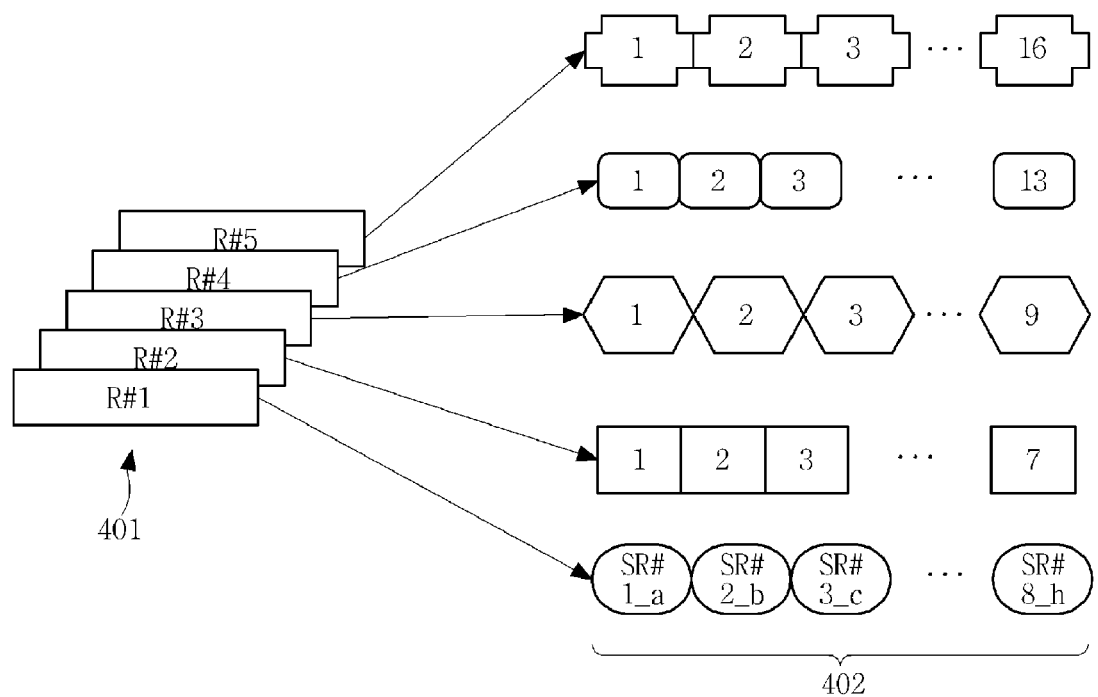
FIG. 4 is a diagram illustrating an example of I/O requests arriving at an SSD and exemplary split sub-requests.

FIG. 4 illustrates exemplary I/O requests 401 arriving at an SSD and exemplary split sub-requests 402.

Referring to FIG. 4, respective I/O requests R#1, R#2, R#3, R#4, and R#5 sequentially arrive from a host at an SSD and are split into sub-requests. For example, the I/O request R#1 may be split into 8 sub-requests SR#1_a through SR#1_h. At this time, a splitting unit (i.e., the size of a sub-request) may be defined as a size, such as, for example, a page unit or a block unit of a flash memory that can be I/O-processed independently by each flash memory.

Hereinafter, it is assumed that sub-requests split from a single I/O request have the same shape and are given serial numbers. For example, the sub-requests of the I/O request R#2 may be indicated by a rectangle and may be given serial numbers of 1 to 7 since the I/O request R#2 is split into seven sub-requests.

Figure 5:
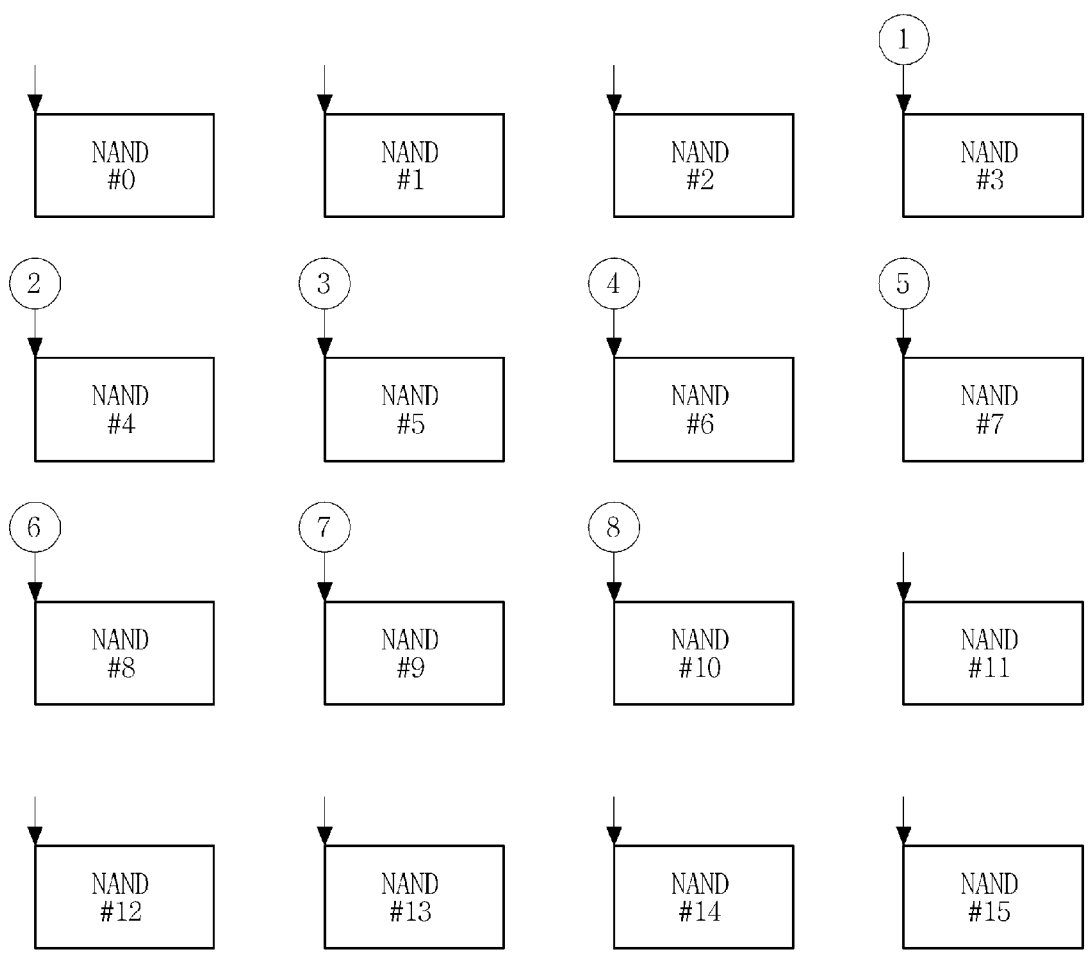
FIG. 5 is a diagram illustrating storing sub-requests of I/O request R#1 in virtual queues of an exemplary SSD.

FIG. 5 illustrates storing sub-requests of I/O request R#1 in virtual queues of an exemplary SSD.

Referring to FIG. 5, sub-requests of the I/O request R#1, which arrive first, are added to corresponding virtual queues, respectively. For example, if an I/O address of a sub-request 1 is designated to a NAND#3, the other sub-requests may be consecutively designated as corresponding to NAND#4 through NAND#10 in sequence because the I/O request R#1 has consecutive address spaces.

Figure 6:
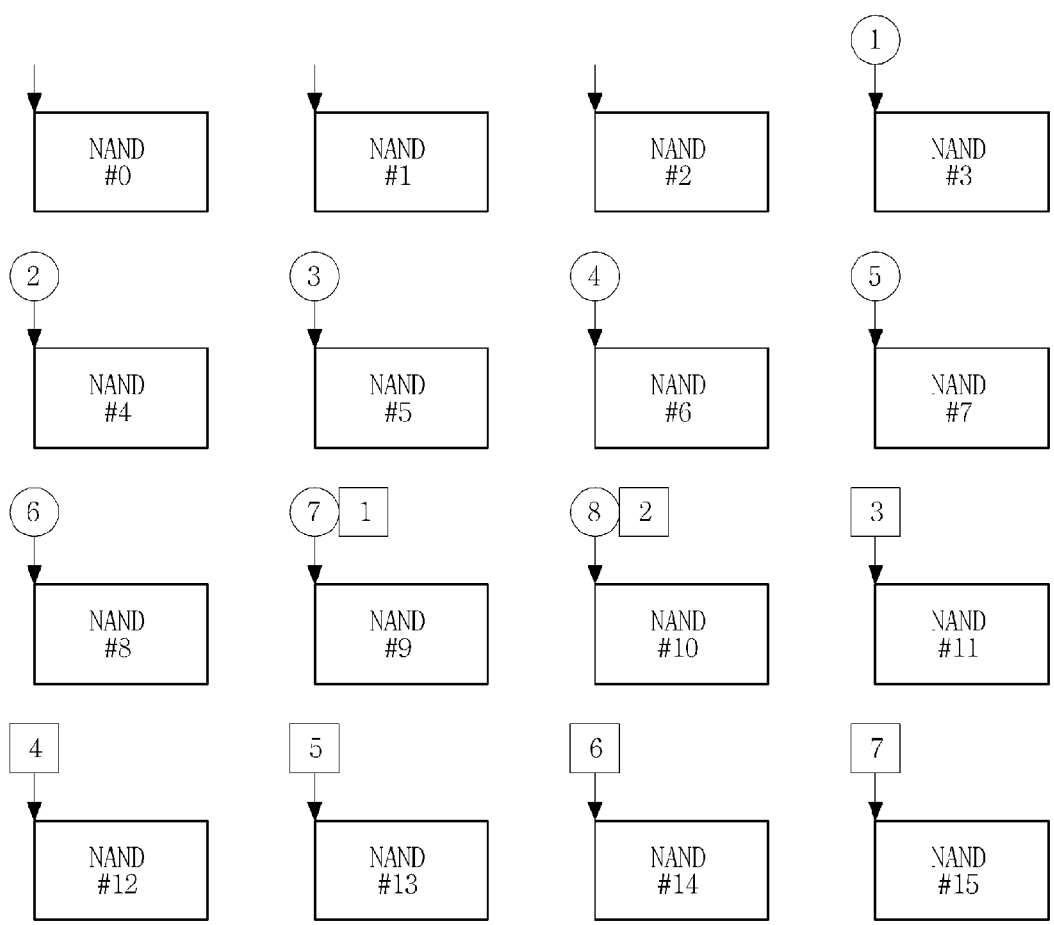
FIG. 6 is a diagram illustrating storing sub-requests of I/O request R#2 in virtual queues of the exemplary SSD.

FIG. 6 illustrates exemplary sub-requests of the second I/O request R#2 added to virtual queues in the SSD.

Referring to FIG. 6, when an I/O address of a sub-request 1 among sub-requests of the second I/O request R#2 corresponds to a NAND#9, virtual queues may be sequentially filled with the other sub-requests of the second I/O request R#2, beginning with the NAND#9. When the NAND#9 may be already filled with sub-requests of the first I/O request R#1, sub-requests of the second I/O request R#2 may be filled sequentially in the following flash memories, beginning with a NAND#10.

Figure 7:
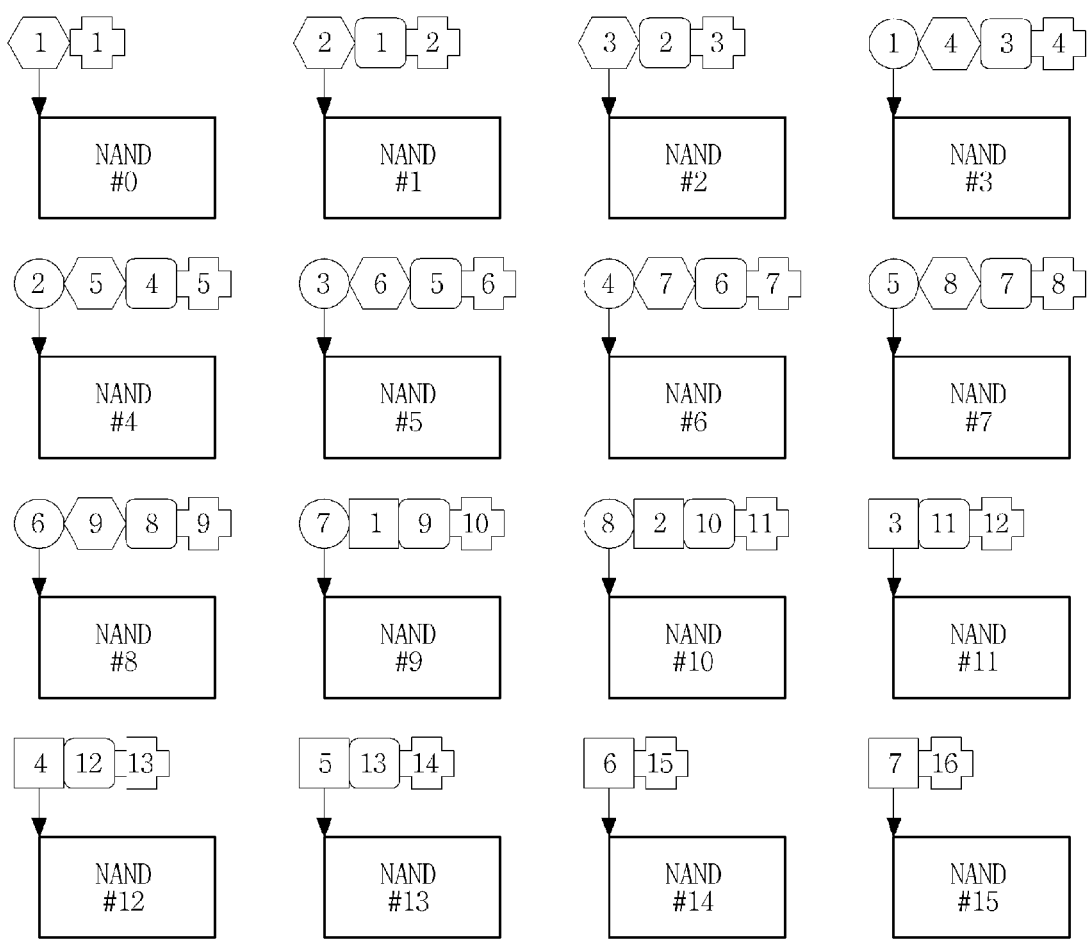
FIG. 7 is a diagram illustrating storing sub-requests of I/O requests R#3, R#4, and R#5 in virtual queues of the exemplary SSD.

In the same way as described with respect to FIGS. 5 and 6, exemplary sub-requests of the other I/O requests R#3, R#4, and R#5 are stored consecutively in the virtual queues as illustrated in FIG. 7.

Figure 8:
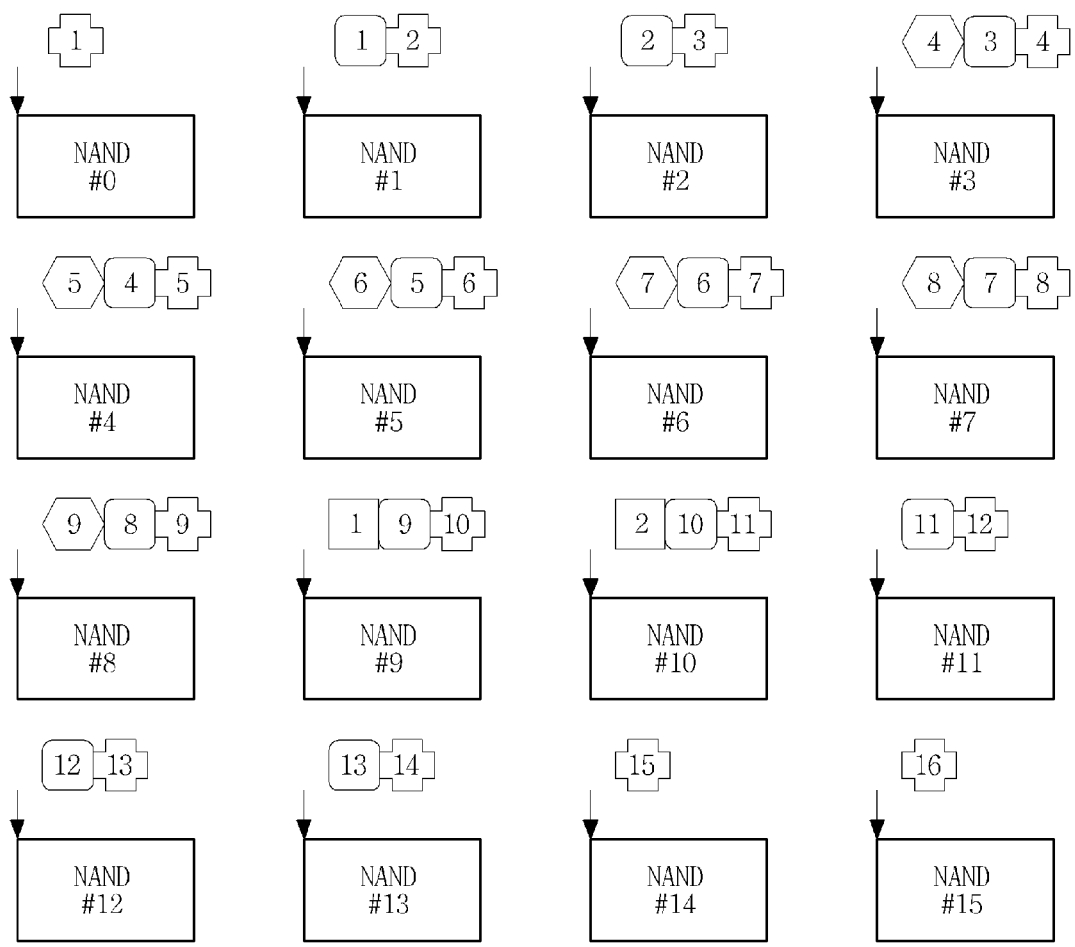
FIG. 8 is a diagram illustrating the result of performing I/O processing through a controller by transferring sub-requests to flash memories of an exemplary SSD.

FIG. 8 illustrates a result of performing I/O processing through the controller by transferring sub-requests to flash memories of an exemplary SSD.

Referring to FIG. 8, the sub-requests first stored in corresponding virtual queues are transferred to corresponding flash memories at once. As described above, one or more I/O requests are split into sub-requests of a size which may be processed independently by each flash memory, sub-requests are temporarily stored, and a plurality of flash memories are simultaneously driven to process the I/O requests, whereby I/O efficiency may be increased since the number of flash memories in an idle state may be reduced.

Figure 9:
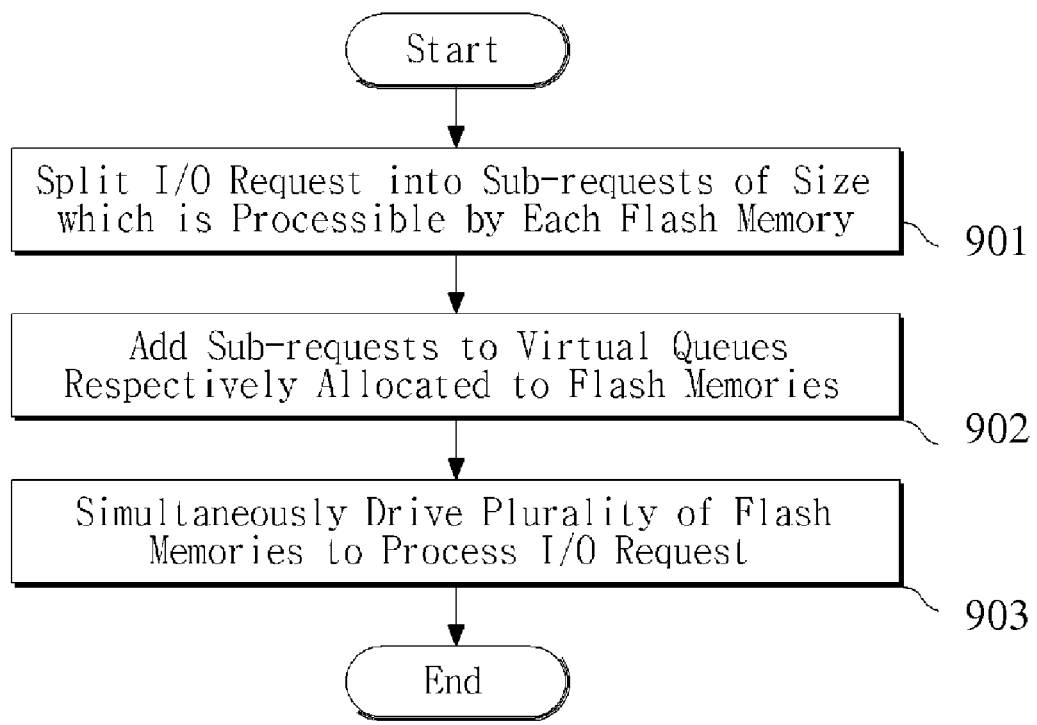
FIG. 9 is a flowchart illustrating an exemplary I/O processing method in an SSD.

FIG. 9 illustrates an exemplary method of processing an I/O request. The exemplary method may be performed by the SSD 100 having the above-described configuration or the controller 102 of the SSD 100.

Referring to FIG. 9, the exemplary method includes a process for splitting an I/O request from a host into sub-requests of smaller size and processing the I/O request from the host based on the sub-requests.

For example, an I/O request may be split into sub-requests of a size which can be processed by each flash memory (901). Here, one or more I/O requests may be received from a host, and each I/O request may be split into sub-requests of a page unit or a block unit of a flash memory.

Next, the sub-requests are added to and temporarily stored in virtual queues, respectively, allocated to flash memories (902). At this time, a virtual queue to be allocated may be determined based on an I/O address included in a sub-request.

Then, some or all flash memories are driven at once based on the sub-requests to simultaneously process one or more I/O requests (903). Before processing an I/O request, a state of a corresponding flash memory may be determined, and an I/O processing may be performed only when the corresponding flash memory is not busy.

The above-described methods may be recorded, stored, or fixed in one or more computer-readable media that includes program instructions to be implemented by a computer to cause a processor to execute or perform the program instructions. The media also may include, independently or in combination with the program, instructions, data files, data structures, and the like. Examples of computer-readable media may include magnetic media, such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and/or methods described above.

As apparent from the above description, using the exemplary method of processing an I/O request and the exemplary SSD, individual memory units which constitute the SSD may be utilized in parallel, and thus I/O processing may be rapidly performed.

A number of exemplary embodiments have been described above. Nevertheless, it is understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A solid state drive (SSD), comprising:
   a storage including a plurality of flash memories configured to be independently drivable; and
   a controller to receive an input/output (I/O) request from a host, to split the I/O request into a plurality of sub-requests each having a size configured to be processed independently by each flash memory, and to process the I/O request based on the sub-requests,
   wherein the controller adds the sub-requests to virtual queues.

2. The SSD of claim 1, wherein the virtual queues are respectively allocated to the flash memories.

3. The SSD of claim 2, wherein the sub-requests are added to virtual queues of corresponding flash memories according to I/O addresses included in each of the sub-requests.

4. The SSD of claim 1, wherein the controller drives at least two of the flash memories at once to process at least one I/O request simultaneously.

5. The SSD of claim 1, wherein the controller comprises:
   a splitter to split the I/O request from the host into the plurality of sub-requests; and
   a buffer to store the sub-requests temporarily.

6. The SSD of claim 5, wherein the buffer adds the sub-requests to virtual queues respectively allocated to the flash memories.

7. The SSD of claim 1, wherein the storage comprises a plurality of NAND flash memories.

8. The SSD of claim 1, wherein the size of each sub-request is one of a page unit and a block unit of the flash memories.

9. The SSD of claim 1, further comprising:
   a host interface to receive the I/O request from the host and to transmit the process result of the I/O request.

10. A method of handling an input/output (I/O) request in a solid state drive (SDD) including a plurality of flash memories, comprising:
    splitting by a controller an I/O request from a host into a plurality of sub-requests each having a size configured to be processed independently by each flash memory; and
    adding by the controller the sub-requests to virtual queues respectively allocated to each flash memory.

11. The method of claim 10, further comprising:
    driving by the controller at least some of the flash memories at once based on the sub-requests to process the at least one I/O request simultaneously.

12. The method of claim 11, wherein the I/O request is processed when the flash memories are not busy.

13. The method of claim 10, wherein the sub-requests are added to virtual queues of corresponding flash memories according to I/O addresses included in each of the sub-requests.

14. The method of claim 10, wherein the size of each sub-request is one of a page unit and a block unit of the flash memories.

15. A solid state drive (SSD), comprising:
    a storage including a plurality of flash memories configured to be independently drivable; and
    a controller to receive an input/output (I/O) request from a host, to split the I/O request into a plurality of sub-requests each having a size configured to be processed independently by each flash memory, and to process the I/O request based on the sub-requests,
    wherein the controller comprises
        a splitter to split the I/O request from the host into the plurality of sub-requests; and
        a buffer to store the sub-requests temporarily.

16. The SSD of claim 15, wherein the controller adds the sub-requests to virtual queues respectively allocated to the flash memories.

17. The SSD of claim 16, wherein the sub-requests are added to virtual queues of corresponding flash memories according to I/O addresses included in each of the sub-requests.

18. The SSD of claim 15, wherein the controller drives at least two of the flash memories at once to process at least one I/O request simultaneously.

19. The SSD of claim 15, wherein the storage comprises a plurality of NAND flash memories.

20. The SSD of claim 15, wherein the size of each sub-request is one of a page unit and a block unit of the flash memories.

* * * * *